June 28, 1966 L. R. BOUTY 3,258,615

IMPULSE SHAPE REGENERATING CIRCUIT

Filed Sept. 18, 1962

Inventor
L.R. BOUTY
By [signature]
Attorney 3,258,615

IMPULSE SHAPE REGENERATING CIRCUIT

Lucien Robert Bouty, Fresnes, France, assignor to International Standard Electric Corporation Filed Sept. 18, 1962, Ser. No. 224,441
6 Claims. (Cl. 307—106)

This invention relates to pulse correction circuits and more particularly to circuits for delivering pulses having constant and easily calibrated pulse lengths.

A problem often met in switching equipment systems relates to the regeneration of electrical pulses. Many circuits have been designed to meet this problem, but these circuits are not entirely satisfactory, either because they are too expensive or because their performance is not entirely sufficient. The present invention saves cost because it uses only conventional, low cost, mass produced commercially available components, such as relays. Nevertheless, the circuit provides high quality performance despite the distortion of input signals and supply voltage variations.

Accordingly, an object of this invention is to provide new and improved pulse correction circuits.

Another objects is to provide adjustable, easily calibrated pulse correction circuits. In this connection, an object is to accomplish these ends through the use of low cost, commercially available components.

Yet another object is to provide a pulse correction circuit which is insulated from variations in either the input signal or the supply voltage.

In accordance with one aspect of this invention, the pulse correction circuit includes a combination of at least two relays. A first relay operates at the beginning of each received or input pulse. This operates a second relay and, in turn, releases the first relay. Then, the second relay releases. The release time of the relays may be adjusted at will. The output pulse is generated during the cumulative release time of each of these two relays. Thus, the output pulse may be closely calibrated, as to width, and the calibration does not depend on either the input pulse received or on the value of the supply voltage.

According to another aspect of the invention, the first relay acts upon the second relay through a third relay which remains in the same position as long as the input pulse lasts. This insulates the first two relays from the input pulse, because a new cycle can start only after a break period marking a separation between two pulses.

In accordance with yet another aspect of the invention, the first relay is equipped with a shunt which is regulated by a potentiometer. This delays the release of the first relay for a given lapse of time. The second relay has two differentially wound windings. It releases when both windings are energized and holds when the first winding is energized. The holding current is regulated by means of a second potentiometer to control the release time of the second relay.

The above mentioned and other features of this invention and the manner of obtaining them will become more apparent, and the invention itself will be best understood by reference to the following description of an embodiment of the invention taken in conjunction with the accompanying drawings, in which.

Figure 1:
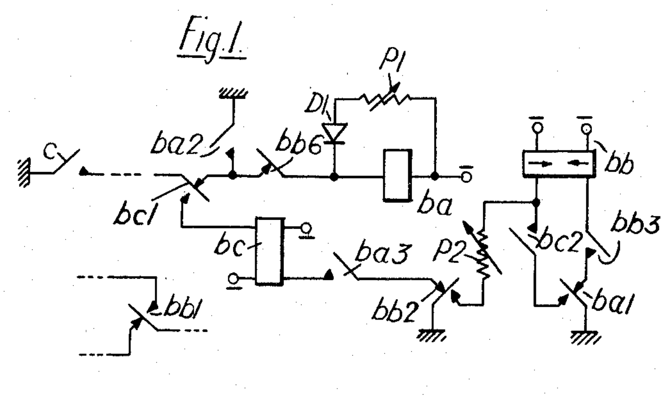
FIGURE 1 is a schematic circuit diagram of a pulse correcting circuit embodying the principles of the invention.

FIG. 1 includes three relays *ba*, *bb*, *bc*, all controlled by input pulsing contacts C. For instance, the contacts C may be operated by a dial pulse responding line relay. In addition, FIG. 1 includes the contacts of various relays, which contacts are designated by the letters of the relay which actuate them, followed by a number which identifies one of several contacts controlled by the indicated relay. All contacts are shown in the condition which occurs when the relays are released.

When an input signal occurs, the contacts C close. This completes a circuit including contacts *bc*1, *bb*6 for operating relay *ba*. A diode D1 is back biased thus rendering ineffective the shunt formed by resistor P1. Relay *ba* holds immediately through its contacts *ba*2. This holding circuit makes relay *ba* lock operated independently of the input pulse.

Responsive to the operation of relay *ba*, relay *bc* is energized via contacts *ba*3 and *bb*2. The operation of contacts *bc*1 locks relay *bc* to the control contacts C. This relay *bc* thus supervises the start of a corrected pulse. It triggers the system formed by first and second relays *ba* and *bb* to generate the next outpulse only after contacts C have opened.

Differential relay *bb* is operated via its left-hand winding and contacts *bc*2 and *ba*1 immediately after the energization of relay *bc*. This opens the break contacts *bb*2 and leaves relay *bc* under the control of contacts C. The closing of the make contacts *bb*2 prepares a circuit for differentially energizing the relay *bb*. An opening of contacts *bb*6 breaks the hold circuit to relay *ba*. The winding of this relay *ba* had time to saturate (i.e. the time required for energization of relay *bc* and then of relay *bb*). Thus, relay *ba* releases slowly because the deenergization of the winding is retarded by the shunt effect produced by potentiometer P1 and diode D1 which is conducting during release. It should be noted that the delay in release is unrelated to the energizing current and therefore to the voltage supplying the system.

After relay *ba* releases, relay *bb* is energized via its two windings. The left-hand winding is energized via operated contacts *bb*2 and potentiometer P2. The right-hand winding is energized via contacts *bb*3 and *ba*1. The flux produced by these two windings are opposing, as indicated in FIG. 1 by two arrows pointing in opposite directions. Relay *bb* releases during a delay period which is also unrelated to the supply voltage of the system, the flux produced by these two windings being about the same regardless of any variations of the energizing voltage.

The system returns to the rest condition when relay *bc* releases after contacts C open.

The corrected or regenerated pulse is supplied to any circuits requiring it by the operation of contacts *bb*1.

Figure 2:
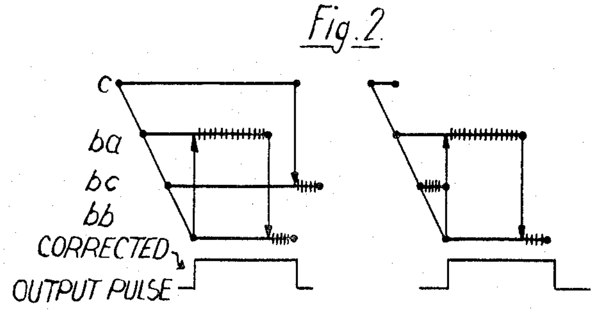
FIGURE 2 is an operating diagram of this pulse correcting circuit.

The diagram of FIG. 2 shows how the relay operation provides a pulse having fixed characteristics. More particularly, in FIG. 2 there are seen two input signal pulses C. The one of the left is very long and the other on the right is very short. The resulting energization of relays *ba, bc, bb,* is represented by a series of broad lines extending left to right in FIG. 2. The arrows indicate the controls and the hatched lines indicate the release delay times of the relays.

As can be seen in FIG. 2, the length of time during which relay *bb* remains operated is equal to the release-delay time of relay *ba* plus the release-delay time of relay *bb*. The duration of the output pulse supplied by contacts *bb*1 is thus independent of the duration of the input pulse appearing at contacts C. The output pulse depends only upon the mechanical and electrical properties of relays *ba* and *bb* as well as upon the resistance of the regulating potentiometers P1 and P2. This is because a shunting of a relay delays its release because the shunt allows the self-inductive current to flow and maintain a magnetic flux in the core of the relay *ba*. The relay *bb* release time is determined by the difference between the fluxes produced by the two windings. When the resulting flux has the same direction as the energizing one, the relay is long to release. When it has the opposite direction, the relay releases quickly. In both cases and more particularly in the first one, the relay undergoes the effect of the supply voltage according to the differential flux value. Such differential flux shall therefore range about 0 and have the reverse direction as the energizing flux (the effect of the voltage being lesser in this direction).

Figure 3:
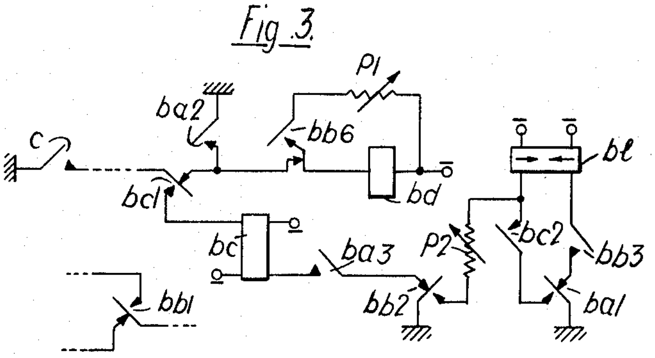
FIGURE 3 is a schematic circuit diagram showing a modification of the circuit of FIG. 1.

FIGURE 3 shows a modification of the system represented by FIGURE 1. There is, however, a single difference. Diode D1 is replaced by make-before-break contacts *bb*6. This arrangement permits an operating process which is the same as the process described relative to FIG. 1. The shunt circuit *bb*6, P1 is not switched in at the moment relay *ba* operates, but only when relay *ba* is deenergized by the operation of relay *bb*.

It should be clearly understood that the above description has been given by way of a non-limiting example and that many other embodiments of the invention may be considered without departing from the scope of the invention.

I claim:

1. A pulse correcting circuit comprising a plurality of slow release relays, means responsive to the beginning of a received pulse for operating a first of said relays, said first relay having a winding which is magnetically saturated when said pulse is received, means responsive to operation of said first relay for operating a second of said relays, means responsive to operation of said second relay for releasing said first relay, non-capacitive adjustable delay means responsive at least in part to the collapse of the magnetic field resulting from de-energization of said first relay for regulating the release time of said first and second relays, and contact means on said second relay controlled by the cumulative release times of said first and second relays for providing an output signal of fixed pulse width.

2. The pulse correcting circuit of claim 1 wherein said means for operating said second relay comprises a third relay, and means responsive to operation of said third relay for precluding the start of a new pulse correction cycle before the termination of an input pulse.

3. The pulse correcting circuit of claim 1 wherein said second relay comprises a differential relay.

4. A pulse correcting circuit comprising a first relay having a winding shunted by an adjustable resistance connected in series with a diode, a second relay having a pair of differential windings, means responsive to the start of each input pulse for operating said first relay, said diode being back biased by operating current to said first relay, means responsive to operation of said first relay for operating said second relay, means responsive to operation of said second relay for breaking the operating circuit to said first relay, thereby removing the back bias from said diode, means responsive to release of said first relay for differentially energizing said second relay, and means for generating an output pulse during the period while said second relay is operated.

5. The pulse correcting circuit of claim 4 wherein said means for operating said second relay comprises a third relay, means for operating said third relay responsive to operation of said first relay, and means responsive to operation of said third relay for transferring the operate circuit of said first relay from said first relay to hold said third relay, whereby said third relay is held for the duration of each input pulse.

6. The pulse correcting circuit of claim 1 wherein said winding of said first relay is included in a circuit which comprises a make-before-break contact combination, means responsive to the start of each impulse for energizing said winding via said break contact, and means responsive to said operation of said second relay for opening said break contact and closing said make contact to complete a circuit for collapsing the magnetic field.

References Cited by the Examiner

UNITED STATES PATENTS

| | | | |
|---|---|---|---|
| 2,938,955 | 5/1960 | Molnar | 317—140 X |
| 2,989,668 | 6/1961 | Parisoe | 317—141 X |

MILTON O. HIRSHFIELD, *Primary Examiner.*

J. J. SWARTZ, *Assistant Examiner.*